P. DAVIS, OF NEWPORT NEWS, VIRGINIA.

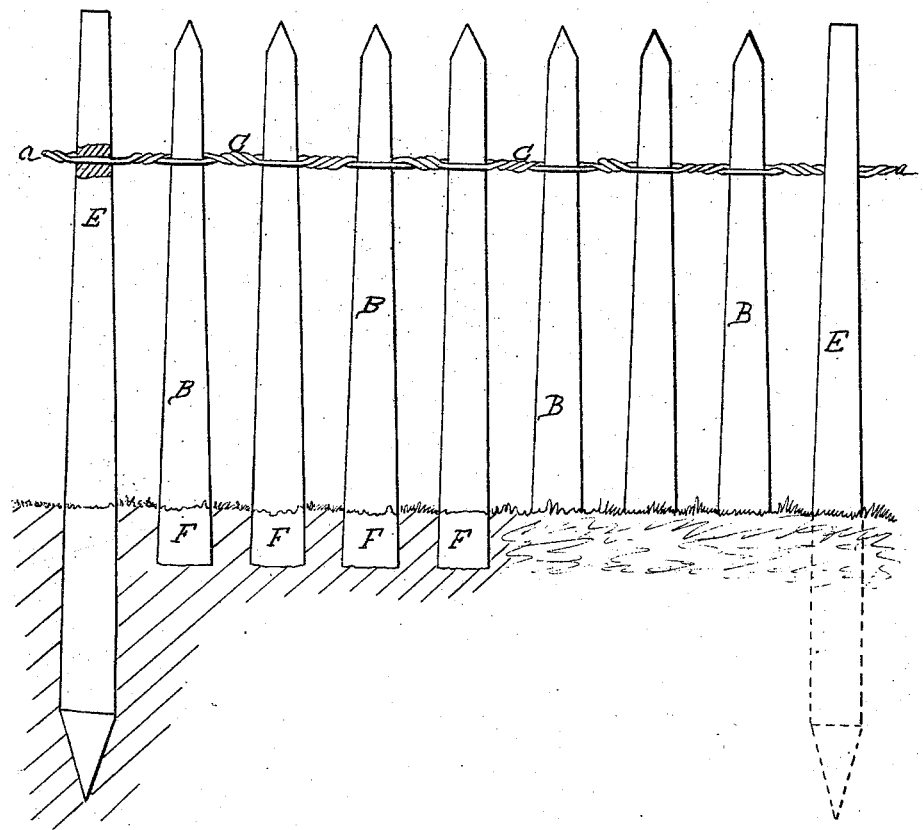

Letters Patent No. 91,918, dated June 29, 1869.

IMPROVEMENT IN FENCE.

The Schedule referred to in these Letters Patent and making part of the same.

*To all whom it may concern:*

Be it known that I, P. DAVIS, of Newport News, in the county of Warwick, and State of Virginia, have invented a new and useful improved Fence; and I do hereby declare the following to be a full, clear, and exact description thereof, which will enable others skilled in the art to make and use the same, reference being had to the accompanying drawings, forming part of this specification, in which the figure is a side elevation of my improved fence, showing the method of construction.

My invention has for its object to improve that class of fences which is formed by inserting the pickets or palings between twisted wires, stretched from post to post; and It consists in the arrangement of the pickets in such a manner, that while their upper ends shall be retained between twisted wires in the usual mode, their lower ends shall be inserted in the earth, thus dispensing with the customary duplicate twisted wires.

By this means, the lower wires usually employed in the construction of such fences are dispensed with, as the ground serves to hold the lower ends of the palings firmly in place.

In the drawings—

$a\ a$ are the wires, stretched between the posts E E, near their upper ends, as shown.

B are the palings, whose upper ends are inserted between the wires, and partially revolved, to twist the same sufficiently to hold the palings in place.

The latter are revolved alternately in opposite directions, so that the wires shall be crossed between them, as shown at C.

The lower ends F of the palings are coated with tar, to prevent their decomposition when driven into the ground.

My improved fence is cheaply constructed, and, as before mentioned, avoids the necessity of employing bottom wires for holding the pickets in place.

Having thus described my invention,

What I claim as new, and desire to secure by Letters Patent, is—

The fence, constructed as described, of the palings B, inserted at their upper ends between the wires $a\ a$, which are stretched between the posts E E, their lower ends being coated with tar, and driven into the ground, as herein set forth, for the purpose specified.

P. DAVIS.

Witnesses:
B. H. HUESTIS,
E. E. WOODWARD.